United States Patent [19]

Lewis

[11] 3,939,735

[45] Feb. 24, 1976

[54] DOUBLE EPICYCLIC TRANSMISSION STRUCTURE

[75] Inventor: George E. Lewis, Gastonia, N.C.

[73] Assignee: Power-Flo Products, Inc., Gastonia, N.C.

[22] Filed: Apr. 18, 1974

[21] Appl. No.: 461,862

[52] U.S. Cl. .................... 74/758; 74/782; 192/43
[51] Int. Cl.² ................ F16H 57/10; F16D 41/02
[58] Field of Search ............ 74/758, 759, 753, 782; 192/43

[56] References Cited
UNITED STATES PATENTS

| | | | |
|---|---|---|---|
| 2,164,729 | 7/1939 | Wilson | 74/758 |
| 2,546,091 | 3/1951 | Normanville | 74/758 |
| 2,648,998 | 8/1953 | Stoeckicht | 74/758 |
| 2,772,583 | 12/1956 | Harabaugh | 74/758 |
| 3,386,314 | 6/1968 | Stockton | 74/759 |
| 3,447,400 | 6/1969 | Serniuk | 74/782 |

FOREIGN PATENTS OR APPLICATIONS

| | | | |
|---|---|---|---|
| 400,955 | 12/1942 | Italy | 74/782 |

*Primary Examiner*—Samuel Scott
*Assistant Examiner*—P. S. Lall
*Attorney, Agent, or Firm*—Whittemore, Hulbert & Belknap

[57] ABSTRACT

Double epicyclic gear structure including a housing, a drive shaft rotatably mounted within the housing, first epicyclic gear structure mounted on the drive shaft, an input shaft connected to drive the first epicyclic gear structure, speed control structure connected to the sun gear of the first epicyclic gear structure for regulating the speed of rotation thereof, second epicyclic gear structure mounted on the drive shaft and engaged with the first epicyclic gear structure for rotation therewith, a brake band for stopping rotation of the planet gears of the second epicyclic gear structure and one-way clutch means mounting the ring gear of the second epicyclic gear structure on the drive shaft whereby on stopping of rotation of the planet gears about the drive shaft the drive shaft is driven in a forward direction, a brake band operable to prevent rotation of the ring gear of the second epicyclic gear structure and one-way clutch means mounting the planet gears for rotation on the drive shaft whereby on stopping of the rotation of the ring gear of the second epicyclic gear structure the drive shaft is driven in a reverse direction, and an output shaft and differential connected to an output gear on the transmission drive shaft whereby the output shaft may be driven from a constantly driven input shaft in either a forward or reverse direction at variable speed.

9 Claims, 1 Drawing Figure

U.S. Patent  Feb. 24, 1976  3,939,735
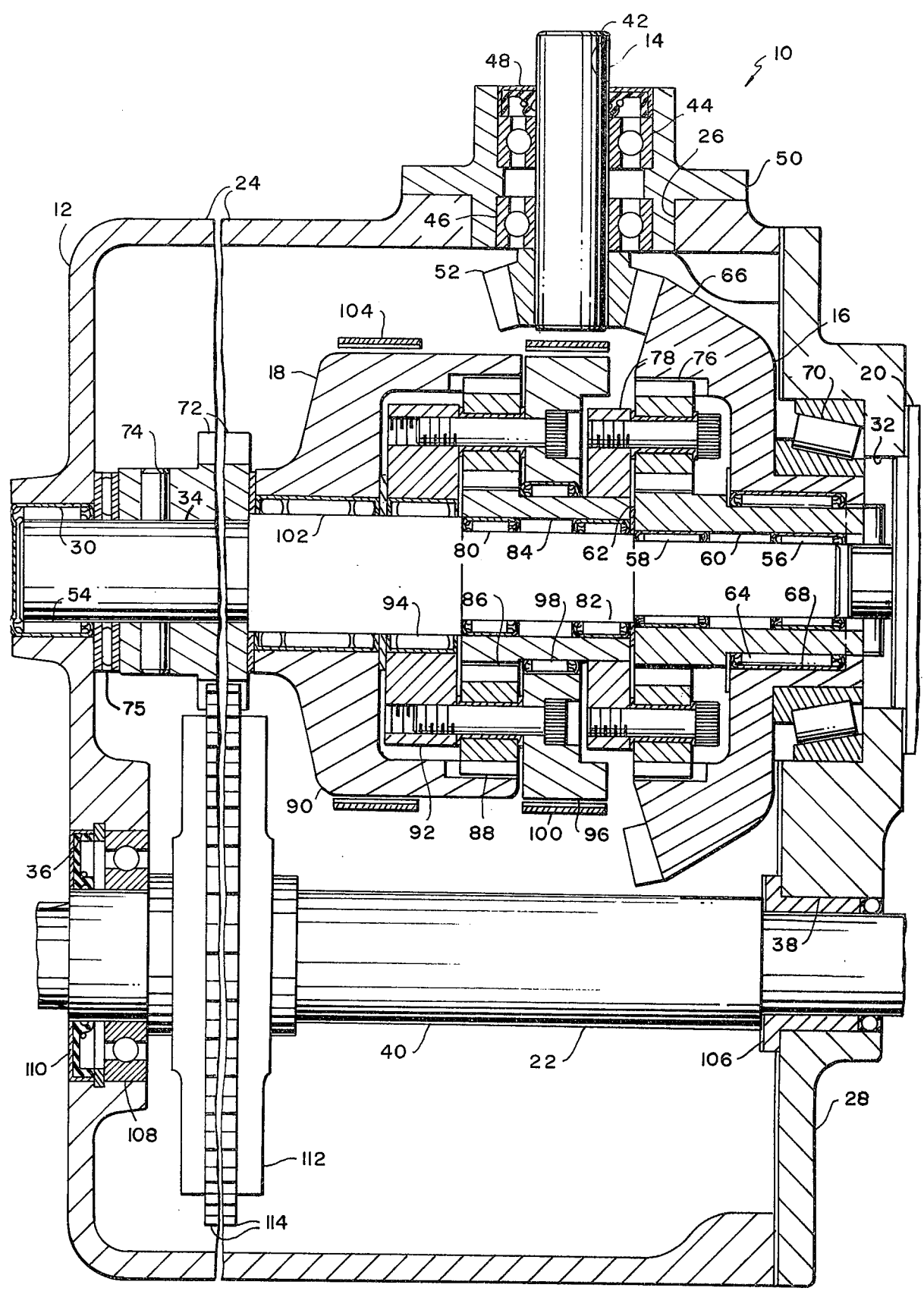

DOUBLE EPICYCLIC TRANSMISSION STRUCTURE

BACKGROUND OF THE INVENTION

1. Field of the Invention

The invention relates to transmission structure and refers more specifically to a double epicyclic, automatic transaxle transmission for small electric or gas powered vehicles, which transmission is capable of both forward or reverse driving at a variable speed.

2. Description of the Prior Art

In the past, automatic transmission structure has been particularly complicated or has been limited to single direction operation. Where both forward and reverse direction operation has been accomplished in the past, it has generally been at a single speed or again the transmissions have been complicated. Wherein automatic transmissions providing for forward and reverse operation at variable speeds have been provided in the past they have, for example, been unduly complicated in that they have required at least two drive shafts having driven and driving gears thereon and shifting or clutch mechanisms for changing gear ratios to very the speed thereof. Such transmissions of the past have therefore been particularly expensive and often inefficient in their output.

SUMMARY OF THE INVENTION

In accordance with the invention, an improved double epicyclic transaxle transmission is provided for small electric or gas powered vehicles, for example, up to 40 horsepower.

The transmission of the invention requires a single drive shaft having first epicyclic gear structure mounted thereon including a sun gear, planet gears, and a ring gear. A single input shaft is provided to rotate the ring gear through meshed bevel gears on the input shaft and the ring gear of the first epicyclic gear structure. The variable speed of the transmission is provided by a speed control valve on a hydraulic pump secured to the sun gear of the first epicyclic gear structure.

The transmission of the invention further includes a second epicyclic gear structure mounted on the single drive shaft for rotation therearound including a sun gear connected to and therefore rotated in accordance with the planet gears of the first epicyclic gear structure, planet gears, one-way clutch means for mounting the planet gears on the drive shaft and means for securing the planet gears of the second epicyclic gear structure against rotation about the drive shaft, a ring gear mounted for rotation on the drive shaft by a one-way clutch and means for preventing rotation of the ring gear of the second epicyclic gear structure about the drive shaft, a drive gear secured to the drive shaft, an output shaft and a differential secured to the output shaft including an outer gear engaged with the drive gear.

Thus, in operation, on driving of the input shaft with the planet gears of the second epicyclic gear shaft prevented from rotation, the drive shaft will be rotated in a forward direction through the ring gear to drive the output shaft in a forward direction at a speed determined by the setting of the pump control valve to determine the speed of rotation of the sun gear of the first epicyclic gear structure. When it is desired to rotate the output shaft in a reverse direction, the ring gear of the second epicyclic gear structure is prevented from rotation so that the drive shaft is driven through the planet gears of the second epicyclic gear structure, again at a speed determined by the setting of the control valve of the hydraulic pump.

BRIEF DESCRIPTION OF THE DRAWINGS

The FIGURE is a cross section view of the transmission structure of the invention.

DESCRIPTION OF THE PREFERRED EMBODIMENTS

As shown in the FIGURE, the double epicyclic, automatic transaxle transmission 10 of the invention includes a housing 12, input structure 14, first epicyclic gear structure 16, second epicyclic gear structure 18, speed control structure 20, and output structure 22.

Housing 12 includes a body portion 24 shaped as shown in the FIGURE and having an opening 26 therein for the input structure 14. The housing 12 also includes a cover 28 which is also shaped as shown in the FIGURE and which may be bolted to the housing body 24. The body portion 24 of the housing 12 and the cover 28 in assembly have the opposed openings 30 and 32 therein in which the drive shaft 34 is journaled for rotation. The speed control structure 20 is secured to cover 28 over opening 32. The housing body 24 and the cover 28 are also provided with the aligned openings 36 and 38 therein in which the output shaft 40 is journaled for rotation.

The input structure 14 includes an input shaft 42 which may be driven by convenient means such as an electric motor or gasoline engine. The shaft 42 is journaled for rotation on the bearings 44 and 46. Seal 48 is provided at one end of the bearing 44 while the other end of the bearing 44 is positioned against the bearing holder member 50. The other bearing 46 also has one end abutting the bearing holder member 50 and is held in place on the input shaft 42 by means of the bevel gear 52. With the bearing holder 50 secured in the opening 26 in the housing body 24, the input shaft 42 is mounted for rotation in the body portion 24 of housing 12.

The drive shaft 34 is secured in the opening 30 for rotation on the bearings 54 at one end and is held for rotation at the other end between the bearings 56 and 58, the sleeve 60 which is an extension of the sun gear 62 of the first epicyclic gear structure 16, the bearing 64 for mounting the ring gear 66 of the first epicyclic gear structure 16 in engagement with bevel gear 52, the sleeve extension 68 of ring gear 66 rotatably mounting the ring gear 66, and the bearing 70 positioned between the sleeve extension 68 and the cover 28 of the housing 12. Drive gear 72 is secured to the shaft 34 by convenient means such as pin 74, and engages thrust bearing 75 sleeved over shaft 34, as shown.

The first epicyclic gear structure 16, besides the sun gear 62 and the ring gear 66, includes the planetary gears 76 mounted on the carrier 78 for rotation therewith about the drive shaft 34 on the bearings 80 and 82. The carrier 78 includes a sleeve portion 84 which has on one end thereof a sun gear portion 86.

The second epicyclic gear structure 18 includes the sun gear portion 86 of the carrier 78, the planet gears 88, and the ring gear structure 90.

The planet gears 88 are mounted on a carrier 92. The carrier 92 is rotatably mounted on the drive shaft 34 by the one-way clutch structure 94 which may be a roller and incline clutch structure or a sprag clutch structure. The carrier 92 further includes a ring portion 96 which is rotatably mounted on the sleeve 84 of the carrier 78 by bearings 98. A brake band 100 is provided for engaging the ring 96 to prevent rotation of the carrier 92 and therefore the planet gears 88 about the shaft 34 to provide forward rotation of the drive shaft 34 through the ring gear structure 90.

The ring gear structure 90 again includes a one-way roller and incline or sprag clutch structure 102 mounting the ring gear structure 90 on the shaft 34. Also, a brake band 104 is provided in conjunction with the ring gear structure 90 to selectively prevent rotation of the ring gear structure 90 whereby the shaft 34 may be rotated in a reverse direction on rotation of the planet gears 88 about the sun gear portion 86 of the holder 78 for the planet gears 76.

The output structure 22 includes the output shaft 40, the bearings 106 and 108, and seal 110 along with the differential structure 112. The differential structure 112 includes an external gear 114 meshed with the drive gear 72 whereby the output shaft 40 is rotated in relation to the rotation of the drive shaft 34.

Thus, in overall operation of the transmission 10, on rotation of the input shaft 42 the ring gear 66 of the first epicyclic gear structure 16 is rotated through the bevel gear 52. On rotation of the ring gear 66, the planet gears 76 are rotated and move around shaft 34 in accordance with the resistance to rotation of the sun gear 62. The resistance to rotation of the sun gear 62 is determined by a hydraulic valve in the hydraulic pump speed control structure 20.

Rotation of the planet gears 76 will produce rotation of the sun gear portion 86 of the planet gear carrier 78, whereby the planet gears 88 will either rotate around the sun gear portion 86 of the carrier 78 or they will rotate about their own axis in a fixed position in relation to the shaft 34 depending on whether the brake band 100 is engaged with the ring gear 96 to prevent rotation of the planet gears about the center line of the shaft 34 to provide rotation of the ring gear 90 and thus forward driving of the output shaft 40 through the shaft 34, drive gear 72, and differential 112, or whether the brake band 104 is engaged with the ring gear 90 to prevent rotation of the ring gear 90 and thus permit travel of the planet gears 86 about the shaft 34 to produce driving of the shaft 34 through the one-way clutch structure 94 to subsequently drive the output shaft 40 in a reverse direction. Obviously the bands 96 and 104 must be alternatively operated and may be operated by known hydraulic or electric structure, not shown.

It will thus be seen that the transmission 10 will provide both forward and reverse driving of the output shaft 40 at a variable speed depending on the control of the hydraulic pump structure 20 and the actuation of the band 100 and 104.

Further, it will be noted that the double epicyclic automatic transaxle transmission disclosed will produce an increased reduction in the ratio of the initial stage on a single shaft when compared with other transaxle transmissions available, that the forward and reverse control is improved in comparison to other transaxle transmissions available through the use of the brake bands 100 and 104 and one-way clutch structures 94 and 102. Also, the gear design is simplified for low cost production and efficient ratios, and the entire structure is particularly efficient in permitting reduction of hydraulic pump speed to an optimum efficiency when considering flow versus torque in the hydraulic speed control structure.

Further, the inclusion of the complete transmission on a single drive shaft provides considerable economy, particularly in view of the various drive ratios required in such transaxle transmission units. Also, it will be recognized that particular economy may be accomplished by use of powdered metallurgy technique in production of the parts, and that the structure is particularly suited for economy in production and servicing.

While one embodiment of the invention has been considered in detail, it will be understood that other embodiments and modifications are contemplated. It is the intention to include all such embodiments and modifications as are defined by the appended claims within the scope of the invention.

What I claim as my invention is:

1. A transmission comprising a housing, a drive shaft extending through said housing and journaled therein for rotation, an input shaft extending into the housing, first eipcyclic gear structure rotatably mounted on said drive shaft, means for driving the first epicyclic gear structure from said input shaft, second epicyclic gear structure positioned on said drive shaft adjacent said first epicyclic gear structure and engaged with said first epicyclic gear structure for rotation thereby and including means for rotating the drive shaft in opposite directions to provide forward and reverse drive in accordance with the rotation of the second epicyclic gear structure, an output shaft and means for driving the output shaft from the drive shaft.

2. Structure as set forth in claim 1 and further including speed control structure operably associated with said first epicyclic gear structure.

3. Structure as set forth in claim 2 wherein the first epicyclic gear structure comprises a ring gear, planet gears engaged with said ring gear, and a sun gear engaged with said planet gears and rotatably mounted on said drive shaft.

4. Structure as set forth in claim 3 and further including speed control means connected to the first epicyclic gear structure comprising a hydraulic pump secured to the sun gear for providing a torque on the sun gear in proportion to the operation of the pump, and valve means for determining the operation of said pump.

5. Structure as set forth in claim 1 wherein the means for driving the first epicyclic gear structure comprises a bevel gear on the input shaft and a meshed bevel gear on the ring gear of the first epicyclic gear structure.

6. Structure as set forth in claim 1 wherein the second epicyclic gear structure comprises a sun gear connected for rotation with the first epicyclic gear structure, planet gears engaged with the sun gear, mounting means for the planet gears mounted for rotation on the drive shaft in a single direction, a ring gear in mesh with the planet gears, and mounting means for the ring gear mounted for rotation on the drive shaft only in a direction opposite said single direction.

7. Structure as set forth in claim 6 wherein the means for providing a forward drive of the drive shaft comprises means for preventing rotation of the planet gears including a brake disc mounted for rotation with the planet gears, and means for selectively securing the brake disc and planet gears against rotation about the drive shaft.

8. Structure as set forth in claim 6 wherein the means for providing a reverse drive of the drive shaft comprises means for preventing rotation of the ring gear comprising a brake band engageable with the ring gear on actuation thereof to stop rotation thereof around the drive shaft.

9. Structure as set forth in claim 1 wherein the output means comprises an output gear secured to the drive shaft for rotation therewith, an output shaft extending through the housing in parallel relation to the drive shaft, and a differential secured to the output shaft including an outer gear engaged with the output gear secured to the drive shaft.

* * * * *